Oct. 18, 1960  S. F. URBAN  2,956,856
METHOD OF DEODORIZING AIR
Filed Nov. 24, 1958
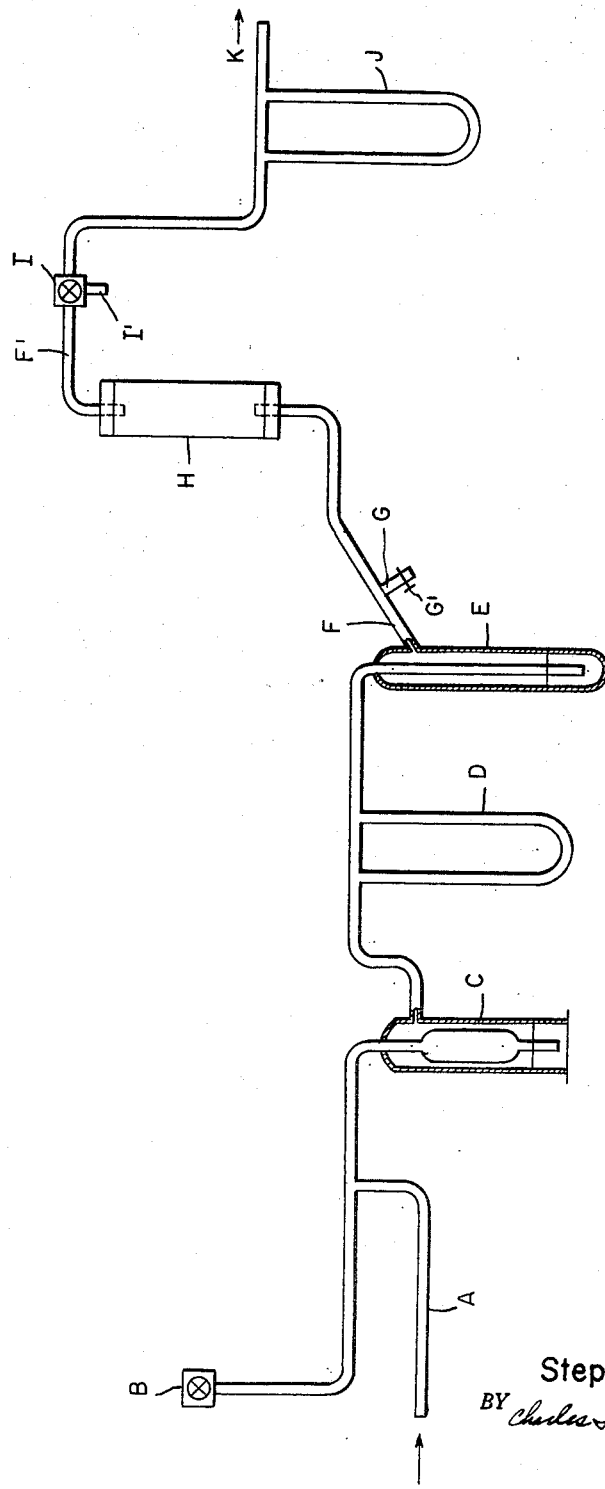
INVENTOR.
Stephen F. Urban
BY *Charles J. Kreyebehn*
ATTY.

2,956,856

METHOD OF DEODORIZING AIR

Stephen F. Urban, Kenmore, N.Y., assignor to National Lead Company, New York, N.Y., a corporation of New Jersey Filed Nov. 24, 1958, Ser. No. 776,022

3 Claims. (Cl. 23—4)

This invention relates to the deodorizing of fluids, more particularly air and other gases.

The invention has for its special object to provide a new method of treating air to deodorize the same or purify the air by the removal of objectionable odors therefrom.

In practicing the present invention to effect the deodorizing of a fluid, more particularly air, it is to be realized that there is a distinction between the term "deodorizing" or "deodorizer" or the use of a deodorizer, and the term "deodorant" or the use of deodorants, since "deodorizing" properties of a material refers to the capacity of the material for removing odors from air and other fluids, while "deodorant" properties refers to, and means, the property of suppressing odors at their source and preventing the odors getting into the air.

The present invention is directed to the deodorizing of air by the employment of basic zirconium sulfate, $5ZrO_2 \cdot 3SO_3 \cdot 15H_2O$, and more particularly to the method of employing the same.

Numerous comparison tests have been made between the compound stated, i.e. basic zirconium sulfate, and other compounds by the procedure hereinafter set forth, which show that basic zirconium sulfate is effective in completely removing from air heavy burdens of such odoriferous substances as onion extract, acetic acid, asafetida, butyric acid, aroma of boiling cabbage, caproic acid, diethyl amine, lactic acid, menhaden oil, pyridine, sardine oil and sulphur dioxide.

Examination of the basic zirconium sulfate following its use to deodorize air impregnated with the odors of the named substances and other substances as will hereinafter appear, suggests that it probably acts by reacting chemically, at least in part, with the sequestered odoriferous substances, due to its complex structure of cations, anions, and coordinated water. In other words, it is believed to act in part chemically, in part as an absorbent and in part as an adsorbent.

The figure of the drawing illustrates diagrammatically apparatus employed for evaluating the deodorizing properties of the basic zirconium sulfate and other agents.

In the making of these evaluations of the agents, odoriferous substances for the tests were selected for the following characteristics: (1) Powerful and unusually objectionable odor. (2) Likelihood of being encountered in homes, plants, restaurants or other public places. (3) Variety of aesthetic and chemical types. Onion juice, bottled by a well known company, proved to be a useful standard substance for comparing the relative deodorizing properties of various compounds.

Referring now more particularly to the drawing, the apparatus diagrammatically shown was used without change throughout the experiments to be described below. The nature of this apparatus will be further clarified by the following description of its use.

Air was introduced into the apparatus through the glass tube A, and its velocity was adjusted by the setting of the valve on the air supply line (not shown), and by the Teflon-and-glass needle valve B. Two manometers D and J in the glass tube system served to measure independently the rate of air flow, the second manometer J serving to check on the flow indicated by the first manometer D and thereby giving warning of leaks in the system. The manometers were calibrated as flow meters against measured volumes of air. The reference character C designates a gas bubbler and the air was passed via this bubbler (which served as an auxiliary flow meter and was particularly useful in making the first rough adjustments of flow rates) to the Y-shaped volatilization tube E.

The general procedure followed was to place 5 ml. of selected odoriferous liquid in the volatilization tube E. Here the air passing through this tube picked up the volatile odoriferous constituent of the substance under test, carrying it from the tube E through the side-arm F to the unit H. This unit was in the form of a canister or suitable receptacle forming with the selected evaluation agent, an absorption column. Between F and the absorption column H there was a side-arm G fitted with a pinch clamp G'. In the diagrammed apparatus, the tube leading from the side-arm F or forming this arm is shown entering the lower end of the absorption column H and from the upper or top end of this column a carry-off tube F' led, as illustrated, in which was located a two-way stop cock I which, when turned to one position, would permit the escape of the air which had passed through the absorption column at the nipple I'. When the pinch clamp G' was opened, the odor-laden air in the system could be smelled and compared with the treated air which could be sampled at the nipple I' by opening the cock I.

The absorption column H was a glass tube 3 cm. in diameter and of sufficient length to contain a charge 12–14 cm. high.

As will be seen in the hereinafter set forth table of comparison tests, different zirconium compounds and control materials were used and these were contained in this column H and the deodorization of the air was effected by the materials in this location. The air discharge was made via the orifice K. As hereinbefore stated, the general procedure consisted in placing 5 ml. of the odoriferous liquid in the tube E. A small plug of glass wool was placed in the side-arm F to prevent droplets of liquid from splashing out of the unit or being carried out by the air stream. The air stream was adjusted to a rate of 80–100 ml./minute and was allowed to continue until an odor was detected on whiffing the effluent air at the valve controlled nipple or orifice at I'. The time which elapsed from the beginning of air flow until the beginning of perception of an odor at I' was recorded and taken as a measure of the effectiveness of the charge in column H as a deodorizer. All runs were terminated at the end of an hour and if no odor was perceptible at I' at this time, the charge in the column was regarded as effective as a deodorizer.

For the purpose of establishing a datum level, some runs were made in the apparatus with the absorption column H filled with glass beads only. Under these conditions a strong odor was always found to be emitted from the orifice at I' after no more than 45 seconds from the beginning of the air flow. Therefore, in later runs with various absorbents in the absorption column or tube H, the failure of odor to become perceptible after more than 45 seconds was taken as evidence of positive action by the absorbent substance.

Fresh charges tested for possible deodorizing action were introduced into the absorption column for each run.

The following table shows a tabulation of observations made on various substances employed or used in the absorption column H as possible deodorizing agents:

Table 1.—Observations on the deodorizing effects of various substances

| Odoriferous Substance | Absorbent | Duration of Effectiveness, Minutes [1] |
|---|---|---|
| onion juice | solid sodium zirconium lactate.[2] | 0.5 |
| Do | dried zirconia alcogel [3] | 8.75 |
| Do | C. P. sodium zirconate [4] | 1.0 |
| Do | dried precipitated zirconium phosphate.[5] | 2.75 |
| Do | basic zirconium sulfate [6] | >60 |
| acetic acid | do.[6] | >60 |
| asafetida [7] | do.[6] | >60 |
| benzene | do.[6] | 2.5 |
| butyl acetate | do.[6] | 15.9 |
| (n-) butyraldehyde | do.[6] | 10.25 |
| (iso-) butyraldehyde | do.[6] | 4.5 |
| butyric acid | do.[6] | >60 |
| cabbage (in boiling water) | do.[6] | >60 |
| caproic acid | do.[6] | >60 |
| diethyl amine [8] | do.[6] | 18 |
| lactic acid | do.[6] | >60 |
| menhaden oil | do.[6] | >60 |
| perfume [9] | do.[6] | 6.75 |
| pyridine | do.[6] | >60 |
| sardine oil | do.[6] | >60 |
| sulfur dioxide [10] | do.[6] | >60 |
| turpentine | do.[6] | 6.75 |

NOTES ON TABLE I

[1] The effectiveness is of a column 3 cm. in diameter and 12-14 cm. high, through which is passed air charged with odoriferous vapor at a rate of 80-100/min. The recorded time in minutes shows how long the deodorizer in the column was effective in completely removing the odor.

[2] As ASTM publication prescribes carbon granules of from −6 to +16 mesh for testing as deodorizer (6). In this test, 93.4 gm. of solid sodium zirconium lactate of from −6 to +16 mesh was used.

[3] The zirconia alcogel used was prepared by washing hydrous zirconia with methanol, then drying it in room air. A mixture of granule sizes, all +40 mesh, was used.

[4] The C. P. sodium zirconate was made by calcining sodium zirconium lactate. The absorption tube was charged with 39.4 gm. of this material of mixed sizes, all +40 mesh.

[5] The zirconium phosphate was a precipitated produce which had been washed and dried at 115° C. The absorption tube was charged with 106.5 gm. of this product, mostly in the form of +40 mesh powder.

[6] Basic zirconium sulfate has the empirical formula $5ZrO_2.3SO_3.15H_2O$, but as used for this experiment it was a water pulp assaying about 45% $ZrO_2$, and only very slightly moist to the touch. For this experimental use, it was broken up with a spatula and it was then found to pass sieves as follows:

Mesh size:  Percent retained
16 ----- 0.30
40 ----- 19.01
120 ----- 33.6
140 ----- 26.8

The 140 mesh sieve passed 20.2% of the total sample. For these tests a 60 gm. sample was used. Also, approximately 60 grams was used for each charge of the absorption tube.

[7] Two 0.39 g. asafetida tablets were incompletely dissolved in a 14 ml. of mixture of benzene and acetone. The solution so obtained was not as foul-smelling as the tincture of asafetida that was once commonly sold by druggists, but which we were unable to obtain. The laboratory solution did have a disagreeable odor, and it was removed by the absorption tower containing basic zirconium sulfate. The odor of the benzene in the solution penetrated the absorption tower.

[8] The diethyl amine was completely volatilized in 18 minutes, and none escaped through the absorption tower.

[9] The perfume was "Menace," manufactured by F. V. Van, Ltd. Its odor began to penetrate the absorption tube after 6.75 minutes, but the effluent from the absorption tube was not as strongly odorous as that from the sampling orifice G (Figure 1).

[10] The sulfur dioxide was introduced into the air stream by bubbling the latter through saturated sodium bisulfite solution in the volatilization tube.

The results of the several experiments set forth in the foregoing table showed or led to the conclusions that:

(1) Basic zirconium sulfate is far superior to other compounds employed such as the zirconium compounds enumerated for the removal of onion odor from air and that the other compounds are generally quite poor deodorizers.

(2) Basic zirconium sulfate is remarkably versatile in the range of odors it can remove, the tests showing that it is perfectly effective for more than an hour's time for a complex variety of substances. This versatility would, therefore, be adequate for many practical applications in connection with the purifying or deodorizing of air.

The deodorizing properties of basic zirconium sulfate are also found to be not readily affected by humidification or dehumidification. In one test made in this connection air which had been dried by passing it through a calcium chloride-filled tower was passed through the absorption column H in which was a charge of basic zirconium sulfate, at a rate of 80-100 ml./min. for 24 hours. The charge lost 2.1 g. of water during this treatment which is in good agreement with a calculated maximum loss to the stated quantity of dry air of 2.7 g.

The dried basic zirconium sulfate was then subjected to the previously established pyridine and found to be as effective as undesiccated charges of basic zirconium sulfate.

Again, air was saturated with water by passing it through a series of bubblers each containing about 7 cm. of water. The first three bubblers were immersed in a water bath at 50° C. and the final bubbler was at room temperature. The saturated air was passed through basic zirconium sulfate in the absorption column for 55 hours at a rate of about 20 ml./min. The basic zirconium sulfate gained 0.46 g. during this time. The deodorizing properties toward pyridine were unchanged by the treatment with moist air. During the treatment with the pyridine-laden air, the basic zirconium sulfate was observed to gain 0.20 g. in weight.

The foregoing observations on odors picked up by the basic zirconium sulfate are believed to indicate that the bulk of absorbed odoriferous material had reacted in some way so that it was no longer present as the original compound but that a small fraction of the odoriferous material persisted on the surface as an unconverted adsorbate.

The tests made upon basic zirconium sulfate to determine its value as a deodorizer show that its versatility is striking.

It will be apparent from the foregoing that basic zirconium sulfate constitutes a valuable and highly versatile deodorizing material when air carrying objectionable odors is brought into contact therewith, particularly under controlled conditions. For example, in accordance with the present invention the method of deodorizing air by means of this compound may consist in charging a suitable receptacle or canister with granular basic zirconium sulfate and then effecting by suitable means the passage through the canister of the air which it is desired to deodorize. Obviously many different constructions might be employed for accomplishing this action. For example, such a canister might be formed with apertured end walls and have a means connected with one end for drawing air into the canister through the opposite end and then discharging the air after it passes through the canister into the atmosphere. By this means, circulation of the air of a room or air from any other source which may contain objectionable odors can be readily purified.

I claim:

1. A method of deodorizing air and other gas which consists in effecting contact of the odor laden gas with basic zirconium sulfate having the formula $$5ZrO_2.3SO_3.15H_2O$$

2. A method of deodorizing air and other gas which consists in flowing the odor laden gas through a mass of basic zirconium sulfate having the formula $$5ZrO_2.3SO_3.15H_2O$$

3. A method of deodorizing air and other gas which consists in confining a quantity of granular basic zirconium sulfate having the formula $$5ZrO_2.3SO_3.15H_2O$$

in a suitable receptacle of a construction to facilitate passage of gas therethrough and then effecting a circulation of the odor laden gas through the receptacle and through the basic zirconium sulfate therein.

References Cited in the file of this patent
UNITED STATES PATENTS 2,206,921    Schultze _____ July 9, 1940

OTHER REFERENCES

Mellor: "A Comprehensive Treatise on Inorganic and Theoretical Chemistry," Longmans, Green and Co., New York, vol. 7, 1927, page 158.